United States Patent Office 3,230,370
Patented Jan. 18, 1966

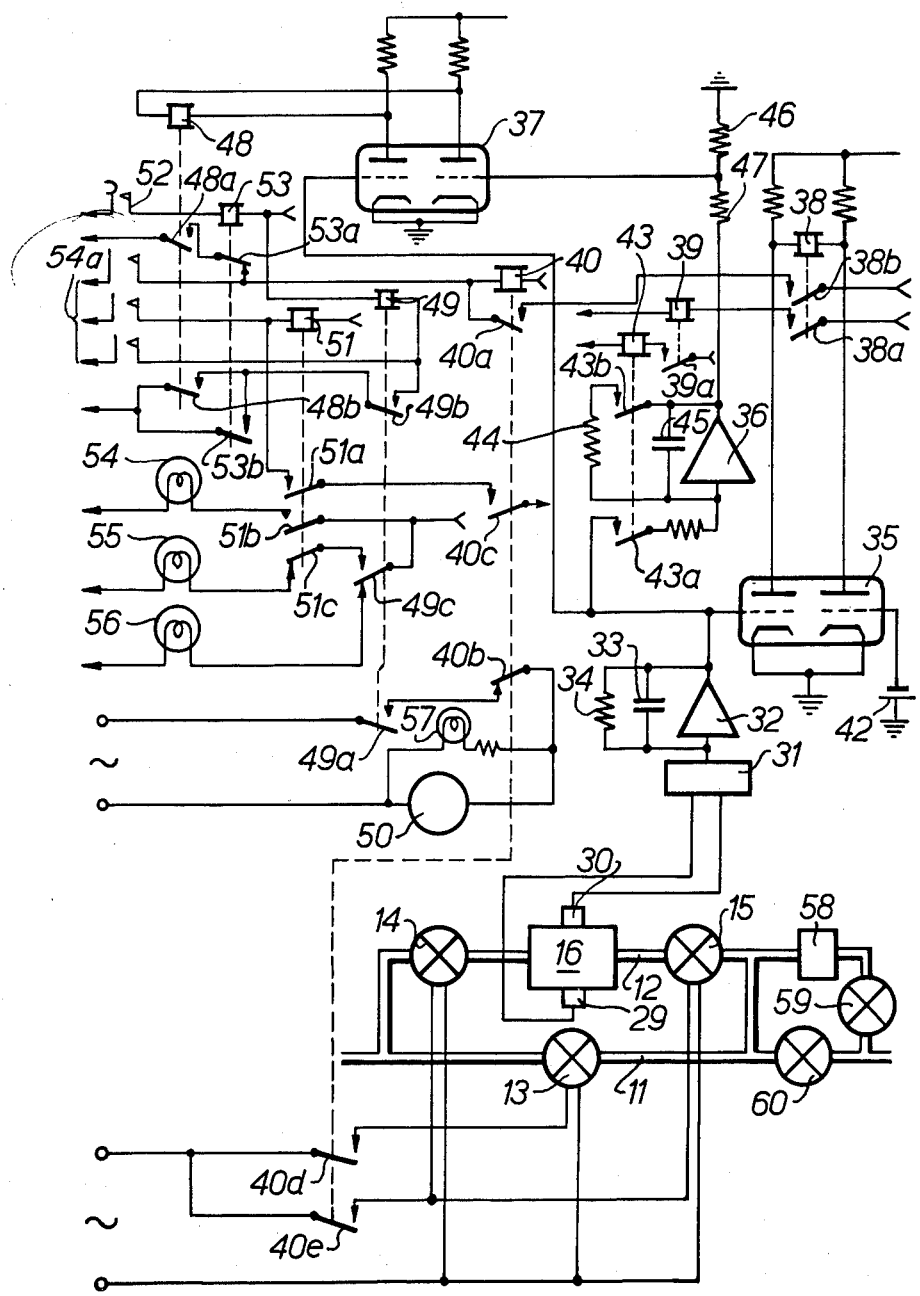

3,230,370
APPARATUS FOR SENSING THE HALF LIFE OF RADIO-ACTIVE MATERIALS
William Fraser MacKie Deans and Eustace Lionel Ernest Harrington, Thurso, Scotland, assignors to United Kingdom Atomic Energy Authority, London, England
Filed Mar. 20, 1963, Ser. No. 266,604
Claims priority, application Great Britain, Apr. 4, 1962, 13,054/62
5 Claims. (Cl. 250—83.3)

The present invention relates to the measuring of the rate of radioactive decay of samples containing radioactive components. In particular the invention seeks to provide apparatus by which the decay rate applicable to a sample presented to the apparatus can be measured automatically without first determining quantitatively the level of radioactivity prevailing in the sample at the time of initiation of the decay measurement.

According to the present invention, an apparatus for insertion in a flow channel to sense the presence of products emitting beta radiation in a predetermined energy band comprises a sample chamber, means for introducing a sample into the chamber and isolating the sample therein, means permitting the flow of fluid past the chamber when the sample is isolated in the chamber, and means responsive to and indicative of the half life of the sample, said responsive means comprising a radiation measuring device for providing an electrical output representative by its magnitude of the radio-activity, within the predetermined energy band, of the sample, an electrical storage means, a timing means responsive to the sample introducing and isolating means to cause the storage in the storage means of an electrical value which is dependant on the instantaneous output of the device, with said storage occurring at the end of a predetermined delay after the isolation of the sample, comparison means for comparing subsequently the stored value with the output of the measuring device, and means actuated by the comparison means for providing a signal indicative of the relationship between the stored value and the output of the device at the end of a second predetermined delay set by the timing means. If the last-mentioned means is adapted to give a signal on the reaching of some preselected relationship, a measure of the decay rate of the radioactivity of the sample is derived from the interval of time between the storage and the giving of the signal. However, if the requirement is merely for an indication of whether the decay rate is greater or less than some specified rate, a timing means may be included to time a period of preset duration commencing with the storage, and, on completion of this period, to actuate an indicating means to the one or the other of two indicating states thereof depending upon whether or not the signal, which is given on reaching the preselected relationship, occurs before the timed period is completed. Preferably the storage means comprises a capacitor; it is necessary that such a component has high insulation resistance in order to avoid leakage.

Apparatus in accordance with the invention is suitable for use in carrying out the method of fission product detection wherein a sample of a suspected fluid is isolated and its radio-activity decay rate sensed in respect of radiation energies in the range 1.5 to 6 mev. Such a method is disclosed in French Patent No. 1,313,498. By way of example, a particular embodiment adapted for this purpose will now be described with reference to the accompanying drawing which shows the embodiment diagrammatically. The requirement in this case is that fission products are detected in a stream of fluid which has passed over sealingly encased nuclear fuel undergoing neutron irradiation in a nuclear reactor.

The gas is assumed for the purposes of the present example to be a coolant derived from at least one core channel or test loop containing, for example, a sheathed fuel element. Preferably only a part of the gaseous coolant in question is tapped off for passing through a conduit system with which the detection apparatus is associated.

The conduit system includes branch pipes 11 and 12, and in the branch pipe 11 is an electromagnetically operated valve 13 and in the branch pipe 12 are two electromagnetically operated valves 14 and 15 disposed one to either side of, and closely adjacent to a boxed scintillation counter 16 comprising a phosphor assembly (described and illustrated in the French patent previously referred to) together with two diametrically opposed photomultiplier tubes 24 and 39. As stated in the French patent, the thickness of the phosphor employed is sufficient to stop beta particles having energies up to about 5 mev. and the photomultiplier tubes included in the scintillation counter are connected in known manner to an amplifier and ratemeter indicated 31 and 32 respectively, the latter incorporating a discriminator which is set in the present case to reject signals corresponding to radiations having energies below 2 mev. The thickness of the phosphor on the one hand and the bias imposed by the discriminator on the other determine the range of radiation energy to which the counter is sensitive, in the present case, 2 mev. up to approximately 5 mev., the upper limit being less clearly defined since phosphor thickness does not give a sharp cut-off.

The voltage output of the ratemeter 32 is representative in magnitude of the count rate, or level of radioactivity, in this range but is delayed by the ratemeter time constant which is indicated separately by the capacitance 33 and the resistance 34. Connections from the ratemeter output terminal are made in parallel to three functionally separate units, namely, a first comparison circuit, including a double triode valve 35, for initiating the isolation and subsequently the decay rate measurement of a gas sample, a storage circuit including a storage amplifier 36 for storing the ratemeter output on initiation of the decay rate measurement, and a second comparison circuit, including a double triode valve 37, for comparing the stored output with the prevailing output from the ratemeter.

More specifically, the first comparison circuit has connected across the anodes of the double triode valve 35 a relay 38 with two make contacts 38a and 38b, the first of these contacts being disposed in the energizing circuit of a time delay element taking the form of a slow release relay 39 in the illustrated embodiment and the other of these contacts being disposed in the energizing circuit of a start relay 40 so as to be in series with a holding contact 40a of this relay. A preset datum voltage is applied by a constant potential source 42 to one of the grids of the double triode valve 35 so that when the ratemeter output voltage applied to the other grid rises to the same value as the datum voltage the relay 38 is de-energized. The slow release characteristic of the relay 39 delays opening of its single break contact 39a by about five seconds.

In the storage circuit, the break contact 39a is disposed in the energizing circuit of a storage relay 43 which has a first break contact 43a in the connection of the ratemeter output terminal to the storage amplifier 36 and a second break contact 43b in a resistance shunt path 44 connected in parallel with a capacitor 45 across the storage amplifier. The storage amplifier employs thermionic valves to provide high input impedance and low output impedance.

The second comparison circuit has one of the two grids of its double triode valve 37 connected directly to the ratemeter output terminal while the other grid is connected to the storage amplifier output terminal through a resistance divider network 46, 47 by which the voltage applied to the respective grid is half the storage amplifier output voltage. Connected across the anodes of the double triode valve 37 is a relay 48 having make contacts 48a and 48b which are both in an alarm circuit now to be described.

In the alarm circuit there are a break contact 40b and a make contact 40c of the start relay 40, the former being in series with a make contact 49a of a relay 49 in the mains circuit of a clock motor 50 and the latter being disposed in an energizing circuit of a relay 51 so as to be in series with a holding contact 51a of this relay. Break contacts 52 controlled by the clock motor 50 are disposed in an energizing circuit of a further relay 53, these contacts being opened automatically when the motor has run for a predetermined period after having been set in motion by closure of its circuit and being re-closed on resetting of the clock motor in readiness for subsequent operation.

Each of the relays 40, 49 and 51 is energizable over respective contacts of a reset key 54a; in the case of the start relay 40 there is a further energizing circuit over a break contact 53a of the relay 53 in series with a make contact 48a of the relay 48. The holding circuit of the relay 49 over its holding contact 49b is completed over two paths in parallel, one including the make contact 48b of the relay 48 and the other including a make contact 53b of the relay 53.

The relays 49 and 51 provide contacts which cooperate in a lamp indicating circuit comprising three lamps 54, 55 and 56. The lamp 54 is to indicate, when illuminated, that the detection apparatus is set and operating normally, the lamp 55 is to indicate, when illuminated, that radioactivity which has initiated a decay rate measurement is not due to fission products, and the lamp 56 is to indicate, when illuminated, that such radioactivity is due to fission products. The control of these lamps by relay contacts 49c, 51b and 51c will be explained subsequently in describing the operation of the detection apparatus.

In the mains circuit of the electromagnetically operated valves 13, 14 and 15, a make contact 40d of the start relay controls energization of the valve 13 and a make contact 40e of the same relay controls in common energization of the valves 14 and 15, the valve 13 being open when de-energized and closed when energized, and the opposite being the case for the valves 14 and 15. Consequently when the start relay 40 is energized, as is normal, gaseous coolant entering the conduit system flows through the branch pipe 12 but on de-energization the flow is diverted through the branch pipe 11 and a gas sample is isolated between the valves 14 and 15.

To prepare the detection apparatus for automatic operation, the reset key 54a is actuated to energize the relays 40, 49 and 51 which remain energized over their respective holding contacts 40a, 49b and 51a. With the start relay 40 thus energized, the gas flows through the branch pipe 12, and, on the assumption that this gives rise to an output from the ratemeter 32 equivalent to a normal background level of radioactivity, the relays 38 and 48 in the first and second comparison circuits respectively are also energized; in consequence of the relay 38 being energized, both the slow release relay 39 and the storage relay 43 are energized. Since the clock motor 50 is adapted to be self-resetting on interruption of its circuit, the clock contacts 52 are closed and hence the relay 53 is energized. Thus, during normal operation, all the relays are energized and over closed contact 51b the normal lamp 54 is illuminated.

If a significant rise occurs in the radioactivity of the gas flowing through the scintillation counter and a level is reached (about 4–5 times the normal background level) when the ratemeter output is substantially the same as the datum voltage applied to the double triode 35, the relay 38 is de-energized to break with its contact 38b the holding circuit of the start relay 40. The start relay is therefore de-energized, its open holding contact 40a inhibiting re-energization by relay 38, and the opening of its contacts 40d, 40e causes immediate reversal of the respective states of the valves 13, 14 and 15 whereby a sample of gas is isolated at the phosphor assembly and the flow is diverted through the branch pipe 11. The closing of the contact 40b of the start relay completes the supply circuit of the clock motor 50 over the make contact 49a of the presently energized relay 49 and the opening of the contact 40c breaks the holding circuit of the relay 51. This latter action causes the normal lamp 54 to be extinguished by opening of the contact 51b and the "other activity" lamp 55 to be illuminated in its place over the contact 51c and the changeover contact 49c of the presently energized relay 49. The conditions now pertaining are therefore that the clock motor has been set in motion for timing its predetermined period, a clock motor lamp 57 in parallel with the motor is illuminated in conjunction with the "other activity" lamp 55, and due to the opening of the contact 38a on de-energization of the relay 38 the slow release relay 39 is de-energized and therefore prepared for releasing after time delay of about five seconds.

During this time delay the exponential rise of the ratemeter output in response to the rise of radioactivity will have reached its equilibrium value and the output will be starting to decay in accordance with the rate of decay of the radioactivity of the isolated sample. Since it is only when the slow release relay 39 opens its contact 39a to de-energize the storage relay 43 that a storage is made in the storage amplifier 36 by opening of the contacts 43a and 43b, the ratemeter output voltage which becomes stored in this way is the equilibrium value or a value occurring shortly afterwards, this value being held on the capacitor 45. Through the resistance divider networks 46, 47 a voltage equal to half the stored value is applied to the comparison amplifier 37.

When the decaying voltage output from the ratemeter becomes equal to half the value stored in the storage amplifier the comparison amplifier 37 causes de-energization of the relay 48 to act as a signal that this condition has been reached. The period of time between the initiation of the decay rate measurement, that is to say, the instant of effecting a storage in the storage amplifier 36, and the giving of this signal is the half life of the radioactivity of the isolated gas sample. If this half life is less than five minutes, this being the period timed by the clock motor 50 when the delay of the slow release relay 39 is substracted, the half life is short and the presence of fission products in the sample is taken to be confirmed.

On completion of the period timed by the clock motor 50, the opening of the break contacts 52 causes de-energization of the relay 53. If the energization of relay 48 has not yet occurred the start relay 40 is promptly re-energized over the contacts 53a and 48a and is held energized over its holding contact 40a and the contact 38b of the relay 38 which will have been previously re-energized as the decaying ratemeter output falls below the datum voltage applied to the first comparison amplifier. The breaking of the clock motor supply circuit at contact 40b serves to reset the motor automatically thereby re-closing the clock contacts 52 and re-energizing the relay 53, the opening of the contact 53a on de-energizising the relay 53 once more renders de-energization of the start relay 40 dependent upon the relay 38. The states of the valves 13, 14 and 15 are restored for normal operation by re-closing of the contacts 40d and 40e. The remainder of the apparatus has also now been restored to the condition for normal operation with the exception that the relay 51 remains de-energized and consequently illumination of the "other activity" lamp persists to indicate in the absence of illumination of the clock motor lamp 57 that the decay rate measurement has been completed with a negative result.

If the energization of relay 48 occurs previous to the completion of the period timed by the clock motor 50, the opening of the contact 48a breaks the re-energizing circuit of the start relay 40 over the contact 53a and the opening of contact 48b conditions the relay 49 for de-energization on breaking of the contact 53b. Thus, on opening of the clock contacts 52 at the end of the timed period, the relays 49 and 53 are de-energized together, and the contact 49a of the former breaks the clock motor supply circuit. In its release position the changeover contact 49c of the relay 49 causes the "fission product" lamp 56 to be illuminated in place of the "other activity" lamp 55, the circuit for the normal lamp 54 remaining interrupted at the open contact 51b. An indication is therefore given at completion of the decay rate measurement that fission products are present in the isolated gas sample.

In the interests of safety the normally energized arrangement is adopted for all the relays to ensure that in the event of any one of them failing to energize and pick up its contacts correctly an alarm indication represented by illumination of the "fission product" lamp will occur either immediately or at least on the next circuit operation (for example, in the case of a failure of the relay 48). Preferably all the relays are double-wound with the windings connected to operate in parallel but each capable of operating the relay singly.

It is preferred to install a further scintillation counter or other device for measuring ionizing radiations in the conduit system downstream of the branch pipes 11 and 12 as indicated at 58. Manually operable on-off valves 59 and 60 enable the gas flow to be either passed through, or diverted past, a shielded compartment containing the phosphor of this scintillation counter, there being also fitted in this compartment a filter (not shown). The counter 58 is less sensitive than the counter 16 and is adapted, such as by using as the phosphor a crystal of sodium iodide, to measure the emission of gamma radiation from solid material trapped on the filter. With the additional counter 58 in operation a check is maintained for further sharp rises of radioactivity whilst the counter 16 is occupied in dealing with an isolated sample. The additional counter is also able to indicate a short burst of radioactivity to which the counter 16 does not respond adequately on account of its inbuilt delay.

What we claim is:

1. An apparatus for insertion in a flow channel to sense the presence of products emitting beta radiation in a predetermined energy band, and comprising a sample chamber, means for introducing a sample into the chamber and isolating the sample therein, means permitting the flow of fluid past the chamber when the sample is isolated in the chamber, and means responsive to and indicative of the half life of the sample, said responsive means comprising a radiation measuring device for providing an electrical output representative by its magnitude of the radioactivity, within the predetermined energy band, of the sample, an electrical storage means, a timing means responsive to isolation of a sample to cause the storage in the storage means of an electrical value which is dependent on the instantaneous output of the radiation measuring device, said storage occurring at the end of a predetermined delay after the isolation of the sample, comparison means for comparing subsequently the stored value with the output of the measuring device, and means actuated by the comparison means for providing a signal indicative of the relationship between the stored value and the output of the device at the end of a second predetermined delay set by the timing means.

2. A decay rate measuring apparatus according to claim 1 wherin the storage means incorporates a means whereby the storage means is adapted to apply at the comparison means an electrical value equal to one half of said instantaneous output.

3. A decay rate measuring apparatus according to claim 1 wherein a storage amplifier serving as the storage means is connected to one input of a difference amplifier serving as the comparison means through a resistance divider network adapted to apply half the stored value to said input.

4. A decay rate measuring apparatus according to claim 1 wherein the last-mentioned means is adapted to give a signal on the reaching of a preselected relationship, and wherein is further included a second timing means adapted to time a period of preset duration commencing at the instant of storage, and an indicating means having two indicating states to the one of which it is actuated if said signal occurs before the timed period is completed and to the other of which it is actuated if the signal occurs thereafter.

5. A radioactivity decay rate measuring apparatus comprising a conduit system with two branch pipes in parallel, electromagnetically operated valves disposed in the conduit system and operable to a first condition to direct flow in the system through one of the branch pipes and to a second condition to direct such flow through the other branch pipe, a sample chamber included in said one branch pipe, a radiation measuring device adapted to provide an electrical output representative by its magnitude of the radioactivity of a sample in said chamber, a first comparison means adapted to compare said output with a preset datum and on a predetermined relationship between the output and the datum being reached to cause operation of the valves from the first condition to the second condition, and electrical storage means, a timing means responsive to said operation of the valves for causing the storage in the storage means of an electrical value which is dependent on the instantaneous output of the radiation measuring device, said storage occurring at the end of a predetermined delay after the isolation of the sample, second comparison means for comparing the stored value with the succeeding output of the measuring device, and means actuated by the second comparison means for providing a signal indicative of the relationship between the stored value and such succeeding output.

References Cited by the Examiner

UNITED STATES PATENTS

| 2,684,479 | 7/1954 | Hill | 317—149 |
| 2,751,494 | 7/1956 | Gray | 330—69 |
| 2,924,718 | 2/1960 | Packard | 250—106 |
| 3,084,251 | 4/1963 | Goupil | 250—71.5 |

FOREIGN PATENTS

| 724,441 | 2/1955 | Great Britain. |

RALPH G. NILSON, *Primary Examiner.*

JAMES W. LAWRENCE, *Examiner.*